United States Patent
Henderson et al.

(10) Patent No.: US 9,550,538 B2
(45) Date of Patent: Jan. 24, 2017

(54) BICYCLE SADDLE WITH A T-SHAPED CHANNEL

(71) Applicant: LEE CHI ENTERPRISES CO., LTD., Changhua (TW)

(72) Inventors: Toby Henderson, Changhua (TW); Colin Esquibel, Changhua (TW); Chin-Hung Lai, Changhua (TW)

(73) Assignee: LEE CHI ENTERPRISES CO., LTD., Changhua (TW)

( * ) Notice: Subject to any disclaimer, the term of this patent is extended or adjusted under 35 U.S.C. 154(b) by 9 days.

(21) Appl. No.: 14/802,445

(22) Filed: Jul. 17, 2015

(65) Prior Publication Data

US 2016/0185408 A1    Jun. 30, 2016

(30) Foreign Application Priority Data

Dec. 30, 2014    (TW) .............................. 103223322 U (51) Int. Cl.
*B62J 1/00*    (2006.01)
*B62J 1/08*    (2006.01)

(52) U.S. Cl.
CPC ............. *B62J 1/08* (2013.01); *B62J 2001/085* (2013.01)

(58) Field of Classification Search
CPC ........................................................ B62J 1/08
USPC .......................... 297/215.13, 215.14, 215.15
See application file for complete search history.

(56) References Cited

U.S. PATENT DOCUMENTS

| | | | | |
|---|---|---|---|---|
| 4,568,121 A | * | 2/1986 | Kashima | .................... B62J 1/08 297/215.15 |
| 4,983,063 A | * | 1/1991 | Phillips | ...................... B62J 1/08 297/215.14 |
| 5,020,851 A | * | 6/1991 | Chen | .......................... B62J 1/08 297/195.1 |
| 5,466,042 A | * | 11/1995 | Herman | ..................... B62J 1/08 297/195.1 |
| 5,501,506 A | * | 3/1996 | Kao | .......................... B62J 1/08 297/215.15 |
| 5,649,738 A | * | 7/1997 | Thomson | ................... B62J 1/08 297/195.1 |
| 5,664,829 A | * | 9/1997 | Thomson | ................... B62J 1/08 297/195.1 |

(Continued)

FOREIGN PATENT DOCUMENTS

| | | | | |
|---|---|---|---|---|
| DE | 202013102348 U1 | * | 6/2013 | ............... B62J 1/08 |
| TW | M383516 U | | 7/2010 | |

(Continued)

*Primary Examiner* — Laurie K Cranmer
(74) *Attorney, Agent, or Firm* — Rabin & Berdo, P.C.

(57) ABSTRACT

A bicycle saddle has a seat post, an adjustment base, a seat, a sliding base, and two adjusting bolts. The seat post has a supporting base having a concave top surface and a passage. The adjustment base is attached to the concave top surface of the supporting base and has a convex bottom surface and an elongated through hole. The convex bottom surface matches and abuts the concave top surface of the supporting base. The seat is attached to the flat top surface of the adjustment base and has a sliding channel. The sliding base is mounted slidably in the sliding channel and has a slot and two holding rods respectively provided with a threaded hole. The adjusting bolts are mounted through the passage, the elongated through hole, and the slot, and are screwed respectively with the threaded holes in the holding rods.

20 Claims, 8 Drawing Sheets

(56) References Cited

U.S. PATENT DOCUMENTS

| | | | | |
|---|---|---|---|---|
| 5,979,978 A * | 11/1999 | Olsen | ............ | B62J 1/08 297/195.1 |
| 5,988,741 A * | 11/1999 | Voss | ............ | B62J 1/08 297/215.14 |
| 6,702,376 B1 * | 3/2004 | Shen | ............ | B62J 1/00 248/371 |
| 6,899,389 B2 * | 5/2005 | Saccucci | ............ | B62J 1/08 297/195.1 |
| 7,059,672 B2 * | 6/2006 | Saccucci | ............ | B62J 1/08 297/195.1 |
| 7,431,391 B2 * | 10/2008 | Hsiao | ............ | B62J 1/08 297/215.14 |
| 7,559,604 B2 * | 7/2009 | Beaulieu | ............ | B62J 1/08 297/215.14 |
| 7,562,933 B1 * | 7/2009 | Chao | ............ | B62J 1/08 297/195.1 |
| 7,621,595 B1 * | 11/2009 | Chen | ............ | B62J 1/08 297/215.13 |
| 7,673,936 B2 * | 3/2010 | Hsu | ............ | B62J 1/08 297/215.13 |
| 8,905,473 B2 * | 12/2014 | Hsu | ............ | B62J 1/08 297/195.1 |
| 2004/0036327 A1 * | 2/2004 | Barandiaran Salaberria | ............ | B62J 1/06 297/215.13 |
| 2004/0174052 A1 * | 9/2004 | Barnett | ............ | B62J 1/08 297/215.13 |
| 2005/0046247 A1 * | 3/2005 | Saccucci | ............ | B62J 1/08 297/215.15 |
| 2006/0006707 A1 * | 1/2006 | Lin | ............ | B62J 1/08 297/215.14 |
| 2009/0001782 A1 * | 1/2009 | Lin | ............ | B62J 1/08 297/215.15 |
| 2010/0320815 A1 * | 12/2010 | Hsu | ............ | B62J 1/08 297/215.13 |
| 2011/0187166 A1 * | 8/2011 | Walsh | ............ | B62J 1/06 297/215.13 |
| 2011/0241390 A1 * | 10/2011 | Tsai | ............ | B62J 1/08 297/215.15 |
| 2013/0221713 A1 * | 8/2013 | Pelot | ............ | B62J 1/02 297/215.13 |

FOREIGN PATENT DOCUMENTS

| | | |
|---|---|---|
| TW | M418851 U | 12/2011 |
| TW | M425815 U | 4/2012 |

* cited by examiner

BICYCLE SADDLE WITH A T-SHAPED CHANNEL

BACKGROUND OF THE INVENTION

1. Field of the Invention

The present invention relates to a bicycle saddle, and more particularly to a bicycle saddle having a T-shaped channel.

2. Description of Related Art

Figure 8:
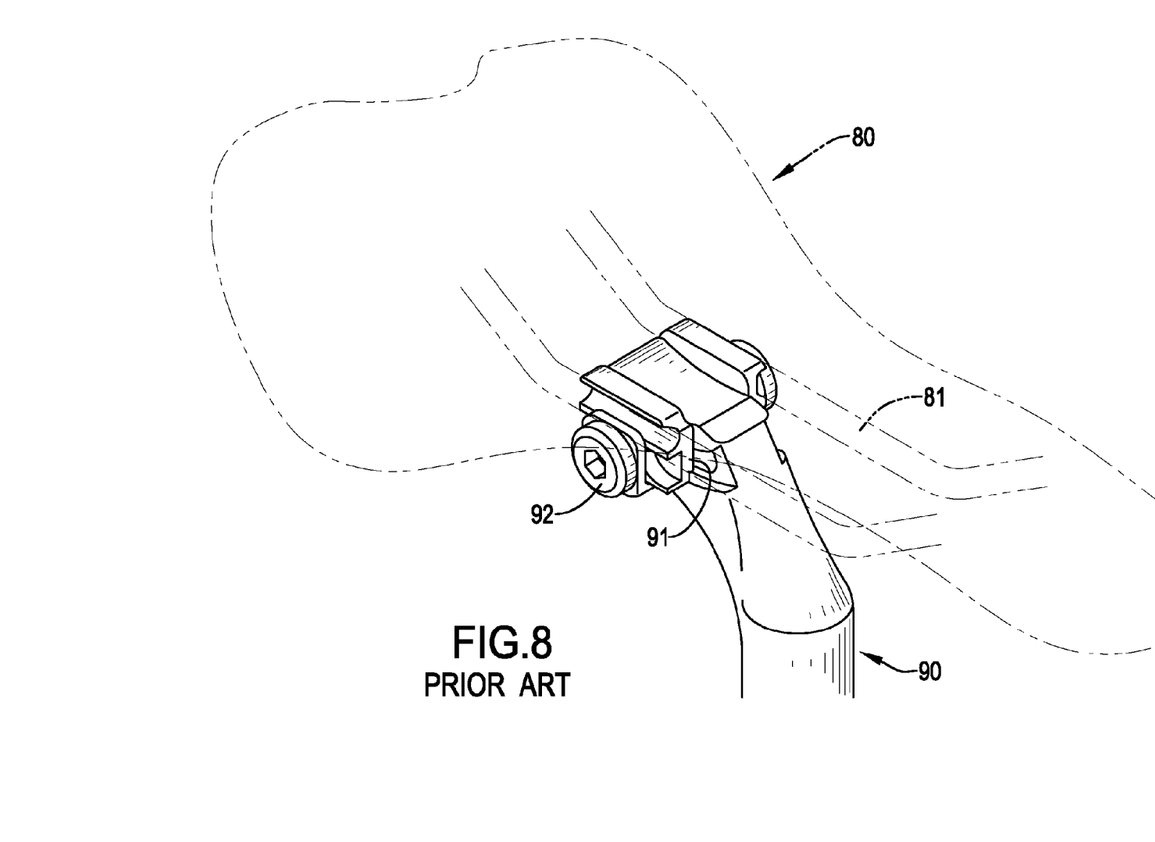
FIG. 8 is a perspective view of a conventional bicycle saddle.

With reference to FIG. 8, a conventional bicycle saddle 80 is mounted on a seat post 90 of a bicycle with a clamping device. A conventional clamping device substantially comprises two clamping caps 91 and a bolt 92. The bolt 92 is connected with the clamping caps 91 in a threaded manner to clamp two holding rods 81 on the saddle 80 in a horizontal direction or a vertical direction. Taiwan Utility Model No. M383516 discloses a clamping device having two clamping caps in a horizontal direction. Taiwan Utility Models No. M418851 and M425815 disclose clamping devices having two clamping caps in a vertical direction.

However, to adjust a position or an angle of the saddle 80, the bolt 92 has to be released first. After the saddle 80 is adjusted to the desired position or angle, the bolt 92 is tightened again. If the position or angle of the saddle 80 is not appropriate, the bolt 92 has to be released and tightened again. Therefore, the conventional clamping device is troublesome in the adjustment of the saddle 80. In addition, the conventional clamping device cannot provide sufficient clamping effect to the saddle 80, and the saddle 80 is easily moved when a rider is riding the bicycle.

To overcome the shortcomings, the present invention tends to provide a bicycle saddle to mitigate or obviate the aforementioned problems.

SUMMARY OF THE INVENTION

The main objective of the invention is to provide a bicycle saddle to easily and conveniently adjust positions and angles of a seat.

The bicycle saddle has a seat post, an adjustment base, a seat, a sliding base, and two adjusting bolts. The seat post has a top end and a supporting base. The supporting base is mounted on the top end and has a concave top surface, a passage, and two bolt holes. The passage is longitudinally formed through the supporting base. The bolt holes are defined in the supporting base respectively at positions adjacent respectively to two ends of the supporting base and communicate with the passage. The adjustment base is attached to the concave top surface of the supporting base and has a convex bottom surface, a flat top surface, and an elongated through hole. The convex bottom surface matches and abuts the concave top surface of the supporting base. The elongated through hole is defined longitudinally through the adjustment base and communicates with the passage in the supporting base. The seat is attached to the flat top surface of the adjustment base and has a bottom surface and a sliding channel. The bottom surface is attached to the flat top surface of the adjustment base. The sliding channel is defined in the bottom surface of the seat and has a T-shaped section and an opening defined in the bottom surface of the seat. The sliding base is mounted slidably in the sliding channel and has a slot and two holding rods. The slot is defined longitudinally through the sliding base. The holding rods are mounted laterally in the slot, and each holding rod has a threaded hole radially formed through the holding rod. The adjusting bolts are mounted through the passage in the supporting base, the elongated through hole in the adjustment base, and the slot in the sliding base, and are screwed respectively with the threaded holes in the holding rods.

Other objects, advantages and novel features of the invention will become more apparent from the following detailed description when taken in conjunction with the accompanying drawings.

DETAILED DESCRIPTION OF PREFERRED EMBODIMENT

With reference to FIGS. 1 to 5, a bicycle saddle in accordance with the present invention comprises a seat post 10, an adjustment base 20, a seat 30, a sliding base 40, and two adjusting bolts 16.

The seat post 10 has a supporting base 11 disposed on a top end of the seat post 10. The supporting base 11 may be formed on the top end of the seat post 10 as a single part or be securely mounted on the top end of the seat post 10. The supporting base 11 has a concave top surface 12, a passage 13, and two bolt holes 14. The concave top surface 12 may be provided with teeth arranged in series. The passage 13 is longitudinally formed through the supporting base 11. The bolt holes 14 are defined in the supporting base 11 respectively at positions adjacent respectively to two ends of the supporting base 11, communicate with the passage 13, and respectively have an axis extending toward the center of the concave top surface 12. Each bolt hole 14 has two inner side surfaces facing each other and two rod holes 141 defined respectively in the inner side surfaces and aligning with each other. Two bolt rods 15 are cylindrical and are mounted respectively and rotatably in the bolt holes 14. Each bolt rod 15 has two ends and a through hole 151. The ends of the bolt rod 15 are respectively and rotatably held in the aligned rod holes 141 in a corresponding one of the bolt holes 14. The through hole 151 is radially defined through the bolt rod 15.

The adjustment base 20 is attached to the concave top surface 12 of the supporting base 11 and has a convex bottom surface 21, a flat top surface 22, and an elongated through hole 23. The convex bottom surface 21 matches and abuts the concave top surface 12 of the supporting base 11 and may be provided with teeth arranged in series. With the engagement between the teeth of the concave top surface 12 of the supporting base 11 and the convex bottom surface 21 of the adjustment base 20, the position of the adjustment base 20 relative to the supporting base 11 can be held. The flat top surface 22 is opposite the convex bottom surface 21 and may be provided with teeth. The elongated through hole 23 is defined longitudinally through the adjustment base 20 and communicates with the passage 13 in the supporting base 11.

The seat 30 is attached to the flat top surface 22 of the adjustment base 20 and has a bottom surface, a sliding channel 31, and a holding recess 32. The bottom surface of the seat 30 is attached to the flat top surface 22 of the adjustment base 20. The sliding channel 31 is defined in the bottom surface of the seat 30 and has a T-shaped section and an opening defined in the bottom surface of the seat 30. With the T-shaped section of the sliding channel 31, a shoulder 311 is formed in the sliding channel 31. In addition, the sliding channel 31 has two ends, and at least one of the ends is an open end. Preferably, the two ends of the sliding channel 31 are open ends. Additionally, the sliding channel 31 further has an escaping channel 312 defined in a top inner surface of the sliding channel 31. The holding recess 32 is defined in the bottom surface of the seat 30 to hold the adjustment base 20 inside the holding recess 32 in position. The holding recess 32 has a bottom surface 33 provided with teeth engaging with the teeth on the flat top surface 22 of the adjustment base 20.

The sliding base 40 is mounted slidably in the sliding channel 31, is supported on the shoulder 311 in the sliding channel 31, and has a slot 42 and two holding rods 44. The slot 42 is defined longitudinally through the sliding base 40. The holding rods 44 are mounted laterally in the slot 42, and each holding rod 44 has a threaded hole 441 radially formed through the holding rod 44. Preferably, the slot 42 of the sliding base 40 has two inner side surfaces facing each other, and each inner side surface has two rod recesses 43 defined in the inner side surface and respectively aligning with the rod recesses 43 in the other inner side surface of the slot 42. Each holding rod 44 is cylindrical and has two ends respectively and rotatably held in the aligned rod recesses 43 in the two inner side surfaces of the slot 42.

The adjusting bolts 16 are mounted through the passage 13 in the supporting base 11, the through holes 151 in the bolt rods 15, the elongated through hole 23 in the adjustment base 20, and the slot 42 in the sliding base 40, and are screwed respectively with the threaded holes 441 in the holding rods 44. The free ends of the adjusting bolt 16 extend into the escaping channel 312 in the sliding channel 31.

Figure 2:
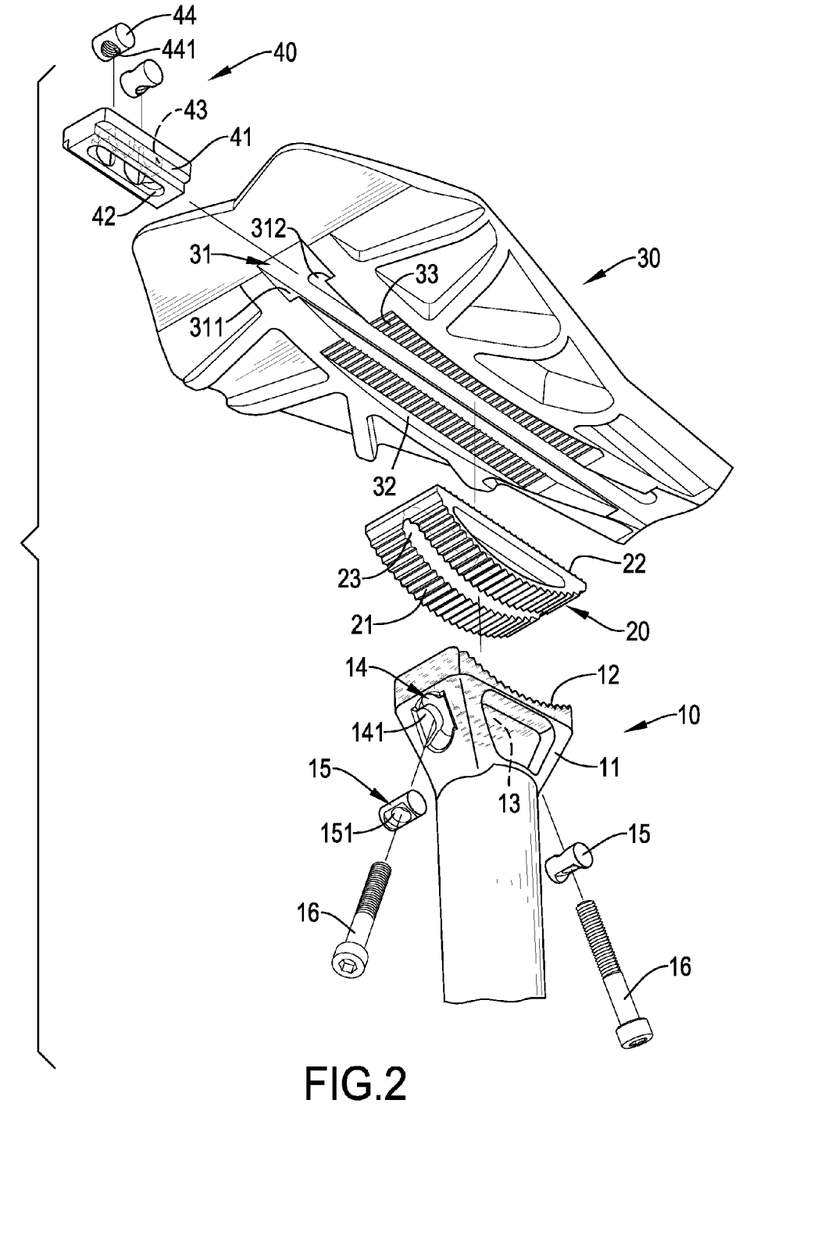
FIG. 2 is an exploded perspective view of the bicycle saddle in FIG. 1.
Figure 3:
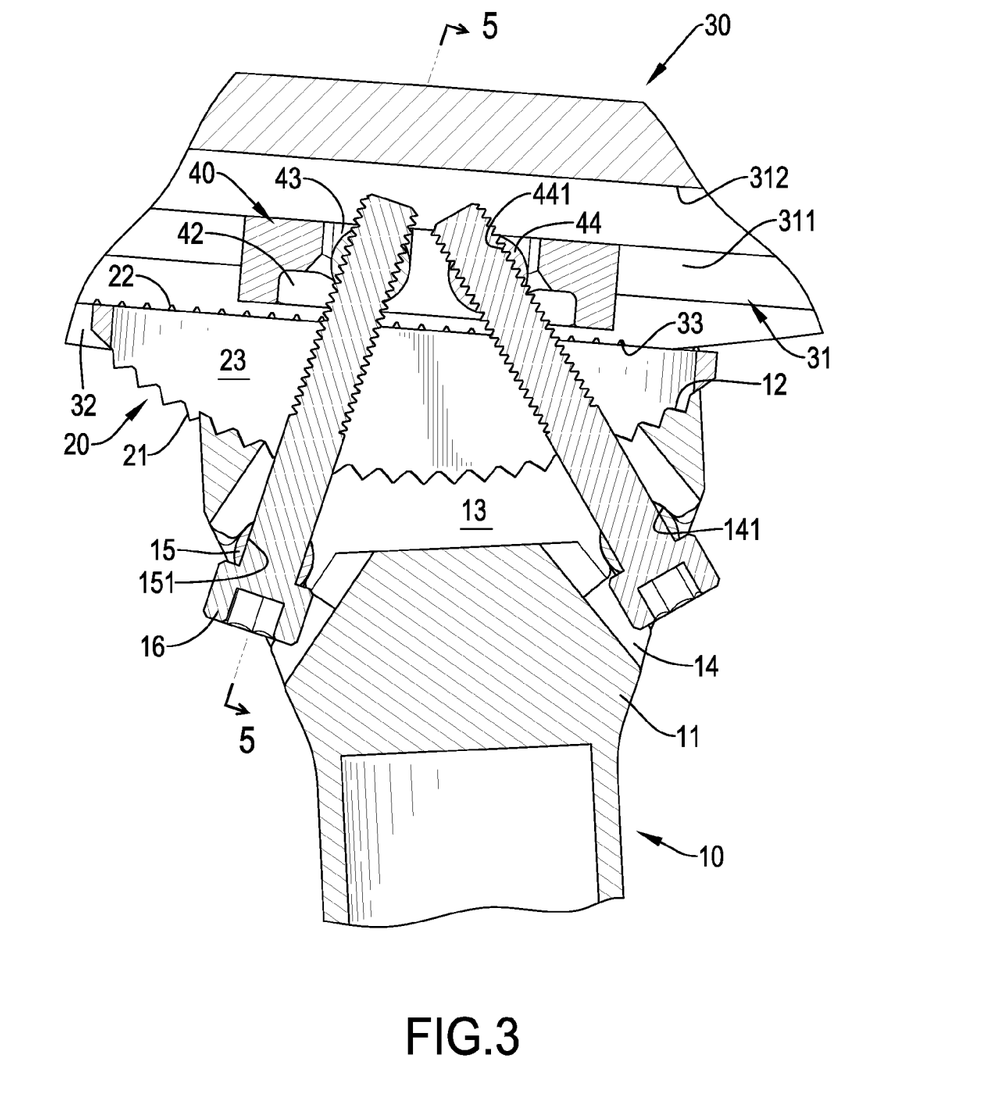
FIG. 3 is an enlarged cross sectional side view of the bicycle saddle in FIG. 1.
Figure 4:
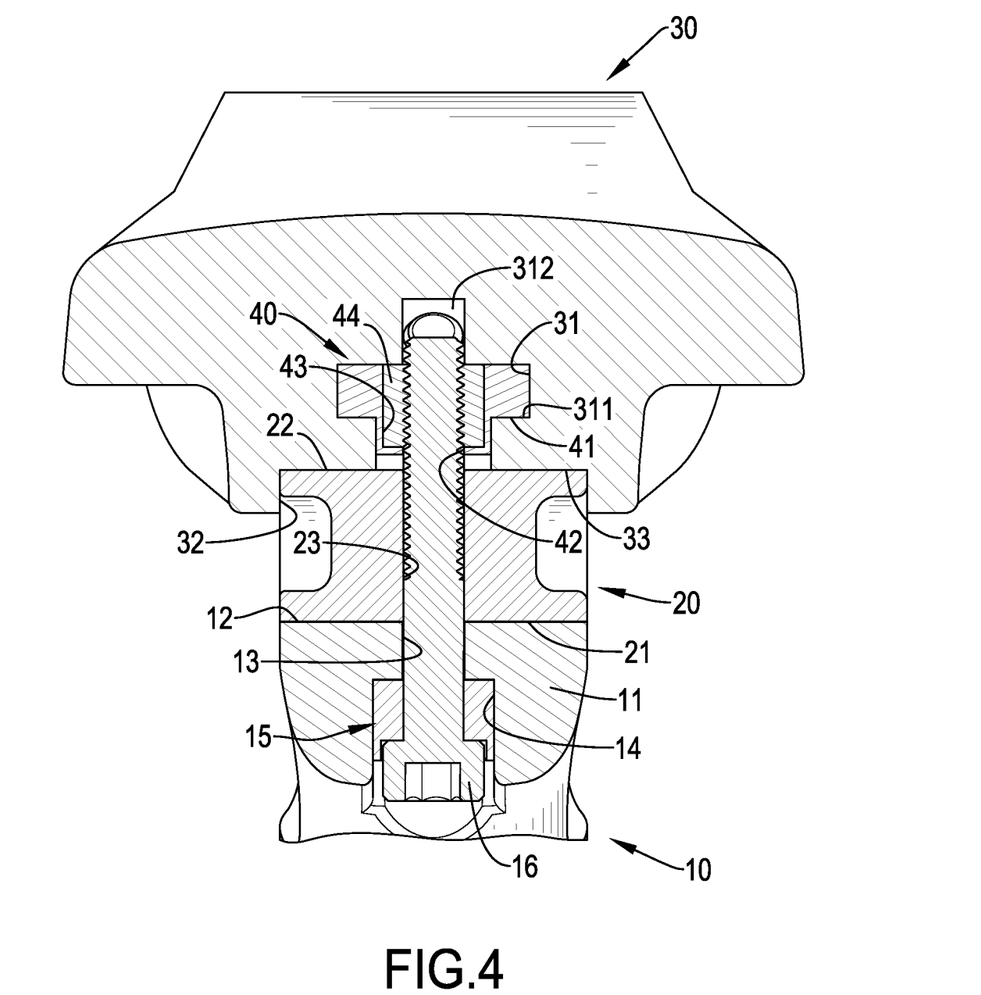
FIG. 4 is an enlarged cross sectional front view of the bicycle saddle in FIG. 1.

With reference to FIGS. 2 to 4, to assemble the saddle, the sliding base 40 is mounted in the T-shaped sliding channel 31 in the seat 30 from one open end of the sliding channel 31, and the flat top surface 22 of the adjustment base 20 is put into the holding recess 32 in the seat 30. The convex bottom surface 21 of the adjustment base 20 is attached onto the concave top surface 12 of the supporting base 11. The adjusting bolts 16 are then mounted through the passage 13 in the supporting base 11, the through holes 151 in the bolt rods 15, the elongated through hole 23 in the adjustment base 20, and the slot 42 in the sliding base 40, and are screwed respectively with the threaded holes 441 in the holding rods 44. With the adjusting bolt 16 screwed with the holding rod 44 and the engagement between the teeth of the seat 30, the teeth of the adjustment base 20, and the teeth of the supporting base 11, the seat 30 can be securely connected with the seat post 10.

Figure 1:
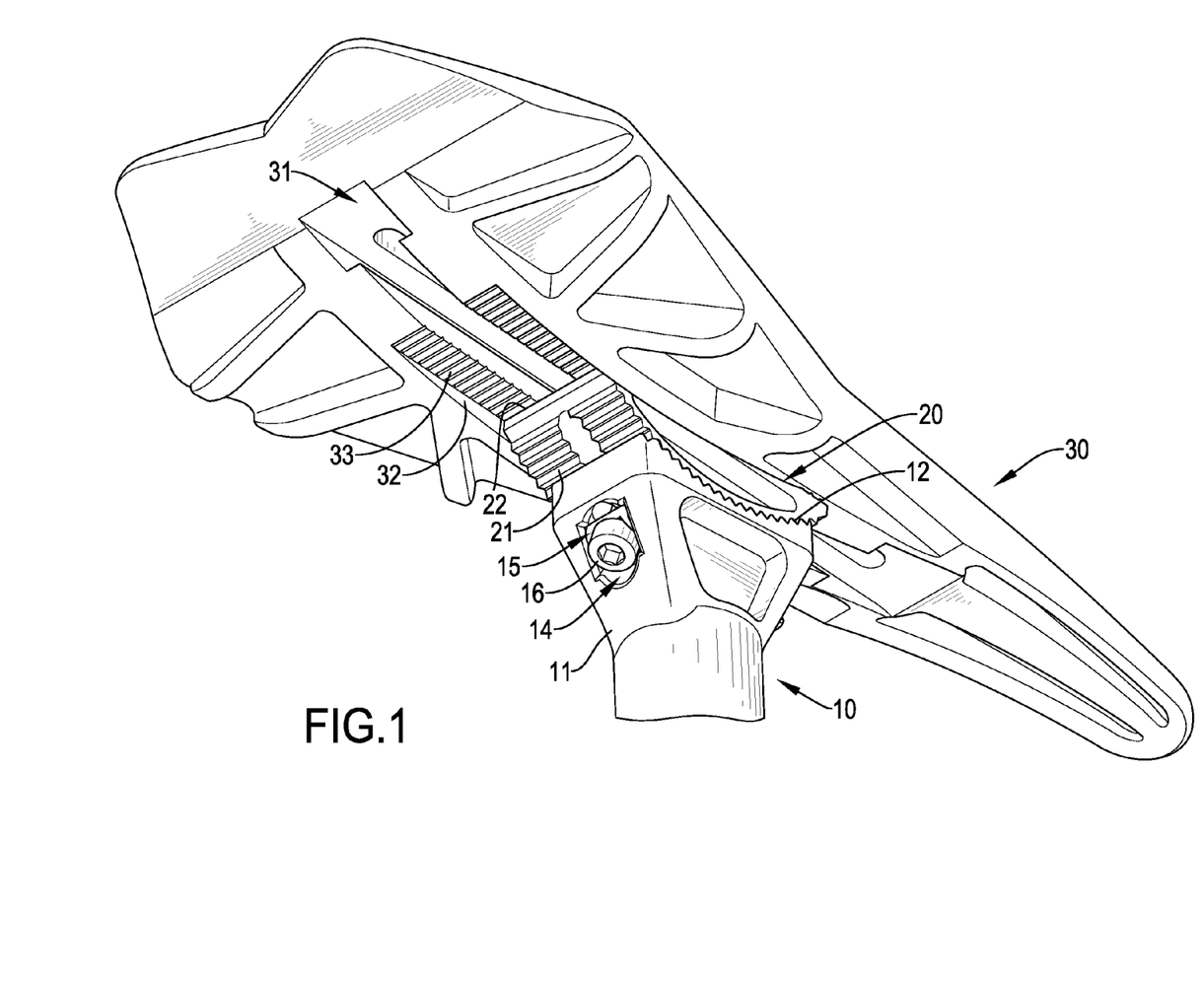
FIG. 1 is a perspective view of a first embodiment of a bicycle saddle in accordance with the present invention.
Figure 5:
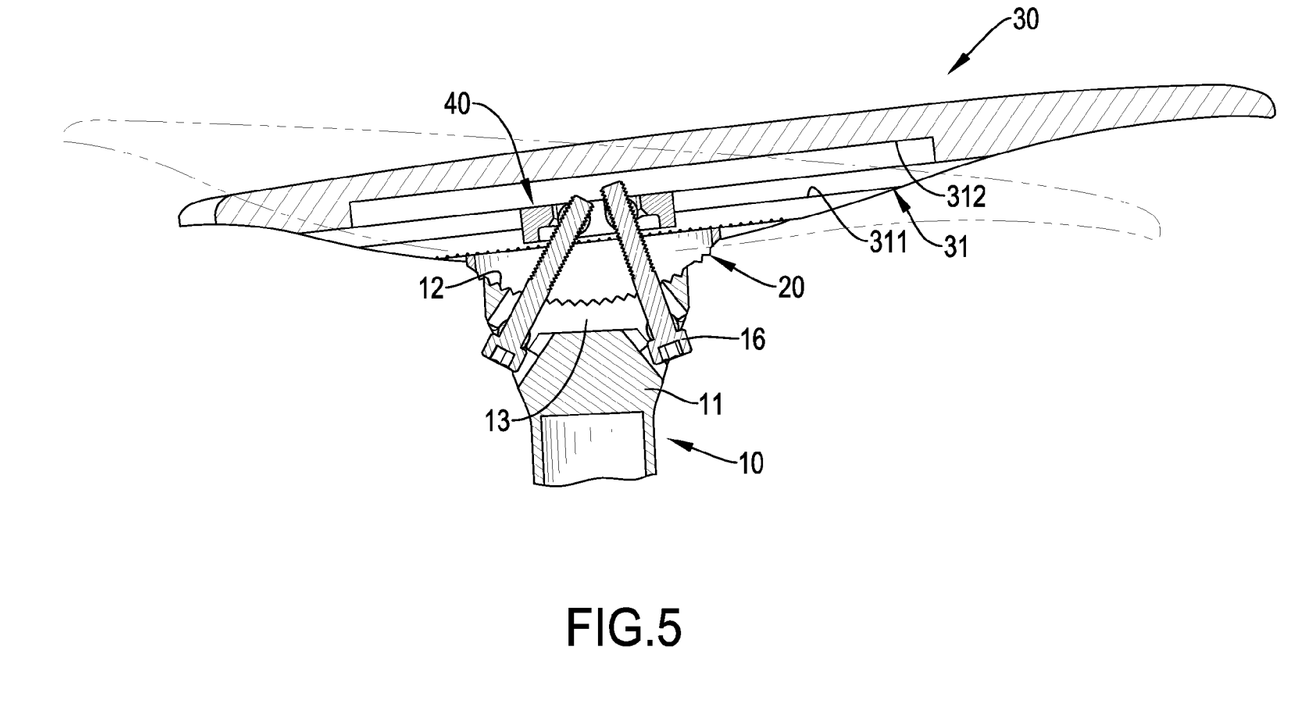
FIG. 5 is an operational cross sectional side view of the bicycle saddle in FIG. 1.

With reference to FIGS. 1, 4, and 5, when the adjusting bolts 16 are slightly released, the seat 30 can be slid relative to the sliding base 40 along the sliding channel 31 to adjust the position of the seat 30 relative to the seat post 10. The angle of the seat 30 relative to the seat post 10 can also be adjusted by pushing or pulling the adjusting bolts 16. Accordingly, to adjust the position and angle of the seat 30 relative to the seat post 10 is easy and convenient.

With reference to FIGS. 1, 3 and 4, with the abutment between the shoulder 311 of the T-shaped sliding channel 31 and the sliding base 40, an I-shaped clamping structure is formed between the seat 30, the sliding base 40, and the adjustment base 20. In addition, with the engagement of the teeth between the seat 30, the teeth of the flat top surface 22 of the adjustment base 20, the teeth of the convex bottom surface 21 of the adjustment base 20, and the teeth of the concave top surface 12 of the supporting base 11, the combination strength applied to the seat 30 can be enhanced and the combination of the seat 30 with the seat post 10 is secure. Accordingly, the seat 30 can be kept from moving when a rider is riding the bicycle, and the safety of riding the bicycle is improved.

Figure 6:
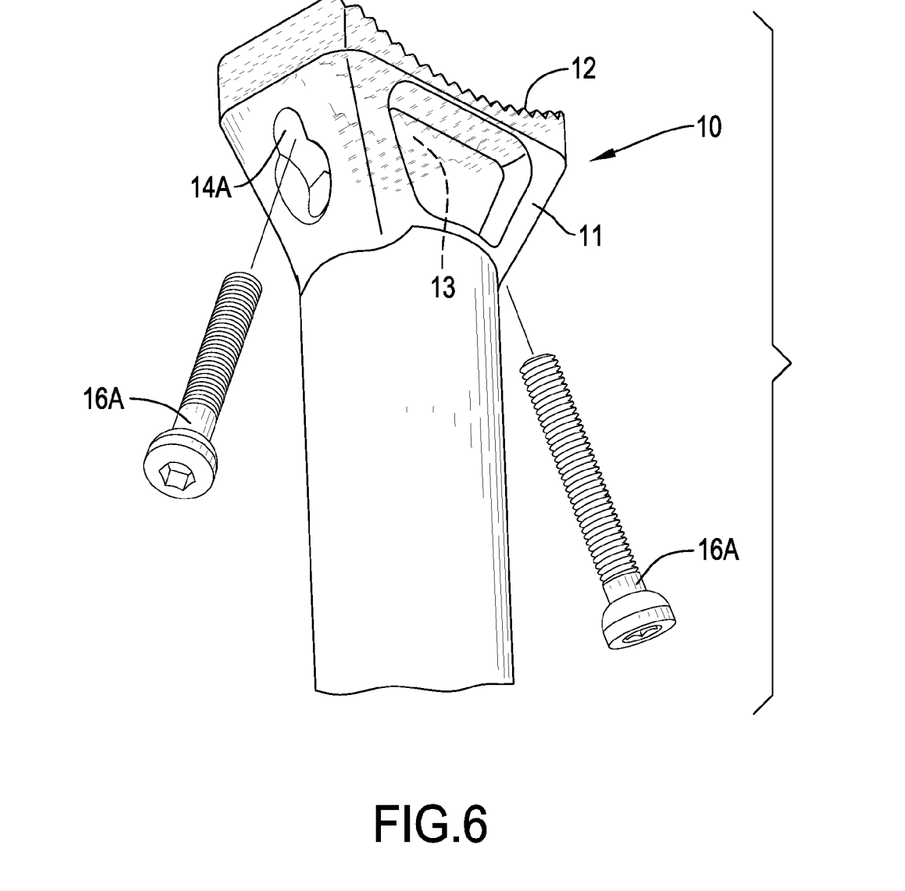
FIG. 6 is an exploded perspective view of a seat post of a second embodiment of a bicycle saddle in accordance with the present invention.
Figure 7:
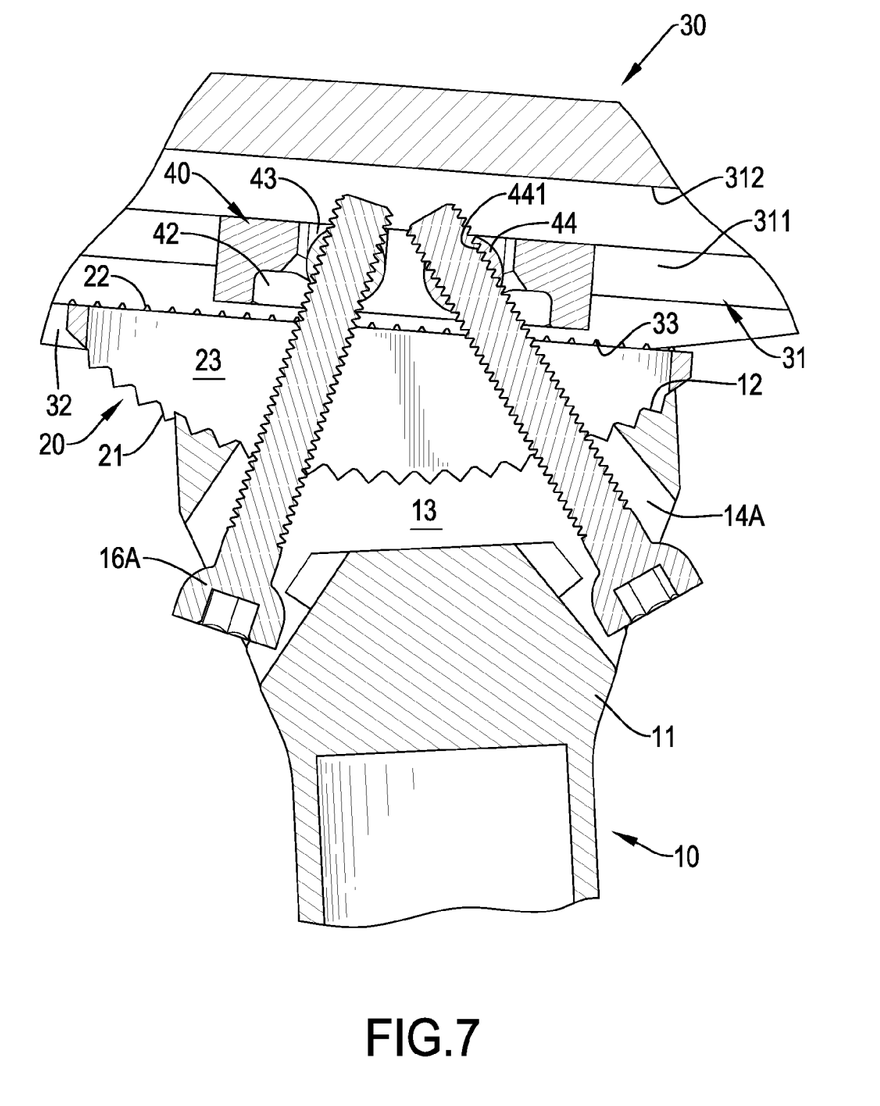
FIG. 7 is a cross sectional side view of the second embodiment of a bicycle saddle in accordance with the present invention.

With reference to FIGS. 6 and 7, in the second embodiment in accordance with the present invention, the bolt rods 15 have been omitted, and the bolt holes 14A are elongated. Each adjusting bolt 16A has a convex head. With the convex heads of the adjusting bolts 16A, to adjust the angle of the seat 30 by pulling or pushing the adjusting bolts 16A is smooth.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:
1. A bicycle saddle comprising:
a seat post having
  a top end; and
  a supporting base disposed on the top end and having
    a concave top surface;
    a passage longitudinally formed through the supporting base;
    two bolt holes defined in the supporting base respectively at positions adjacent respectively to two ends of the supporting base and communicating with the passage;
an adjustment base attached to the concave top surface of the supporting base and having
  a convex bottom surface matching and abutting the concave top surface of the supporting base;
  a flat top surface; and
  an elongated through hole defined longitudinally through the adjustment base and communicating with the passage in the supporting base;
a seat attached to the flat top surface of the adjustment base and having
  a bottom surface attached to the flat top surface of the adjustment base;
  a sliding channel defined in the bottom surface of the seat and having
    a T-shaped section; and
    an opening defined in the bottom surface of the seat;
  a sliding base mounted slidably in the sliding channel and having a slot defined longitudinally through the sliding base; and two holding rods mounted laterally in the slot, and each holding rod having a threaded hole radially formed through the holding rod; and two adjusting bolts mounted through the passage in the supporting base, the elongated through hole in the adjustment base, and the slot in the sliding base, and screwed respectively with the threaded holes in the holding rods.

2. The bicycle saddle as claimed in claim 1, wherein the flat top surface of the adjustment base and the bottom surface of the seat are respectively provided with teeth.

3. The bicycle saddle as claimed in claim 2, wherein the convex bottom surface of the adjustment base and the concave top surface of the supporting base are respectively provided with teeth.

4. The bicycle saddle as claimed in claim 3, wherein
each bolt hole of the supporting base has two inner side surfaces facing each other and two rod holes defined respectively in the inner side surfaces and aligning with each other;
two bolt rods are cylindrical and are mounted respectively in the bolt holes, and each bolt rod has
two ends respectively held in the aligned rod holes in a corresponding one of the bolt holes; and
a through hole radially defined through the bolt rod; and
the adjusting bolts are mounted respectively through the through holes in the bolt rods.

5. The bicycle saddle as claimed in claim 4, wherein the sliding base has a T-shaped section.

6. The bicycle saddle as claimed in claim 5, wherein
the sliding channel has an open end and an escaping channel defined in a top inner surface of the sliding channel.

7. The bicycle saddle as claimed in claim 6, wherein the seat further has a holding recess defined in the bottom surface of the seat to hold the adjustment base inside the holding recess.

8. The bicycle saddle as claimed in claim 7, wherein
the slot of the sliding base has two inner side surfaces facing each other;
each inner side surface of the slot has two rod recesses defined in the inner side surface and respectively aligning with the rod recesses in the other inner side surface of the slot;
each holding rod is cylindrical and has two ends respectively held in the aligned rod recesses in the two inner side surfaces of the slot.

9. The bicycle saddle as claimed in claim 4, wherein
the slot of the sliding base has two inner side surfaces facing each other;
each inner side surface of the slot has two rod recesses defined in the inner side surface and respectively aligning with the rod recesses in the other inner side surface of the slot;
each holding rod is cylindrical and has two ends respectively held in the aligned rod recesses in the two inner side surfaces of the slot.

10. The bicycle saddle as claimed in claim 3, wherein the bolt holes in the supporting base are elongated; and
each adjusting bolt has a convex head.

11. The bicycle saddle as claimed in claim 10, wherein the sliding base has a T-shaped section.

12. The bicycle saddle as claimed in claim 11, wherein
the sliding channel has an open end and an escaping channel defined in a top inner surface of the sliding channel.

13. The bicycle saddle as claimed in claim 12, wherein the seat further has a holding recess defined in the bottom surface of the seat to hold the adjustment base inside the holding recess.

14. The bicycle saddle as claimed in claim 13, wherein
the slot of the sliding base has two inner side surfaces facing each other;
each inner side surface of the slot has two rod recesses defined in the inner side surface and respectively aligning with the rod recesses in the other inner side surface of the slot;
each holding rod is cylindrical and has two ends respectively held in the aligned rod recesses in the two inner side surfaces of the slot.

15. The bicycle saddle as claimed in claim 10, wherein
the slot of the sliding base has two inner side surfaces facing each other;
each inner side surface has two rod recesses defined in the inner side surface and respectively aligning with the rod recesses in the other inner side surface of the slot;
each holding rod is cylindrical and has two ends respectively held in the aligned rod recesses in the two inner side surfaces of the slot.

16. The bicycle saddle as claimed in claim 1, wherein the sliding base has a T-shaped section.

17. The bicycle saddle as claimed in claim 16, wherein
the sliding channel has an open end and an escaping channel defined in a top inner surface of the sliding channel.

18. The bicycle saddle as claimed in claim 17, wherein the seat further has a holding recess defined in the bottom surface of the seat to hold the adjustment base inside the holding recess.

19. The bicycle saddle as claimed in claim 18, wherein
the slot of the sliding base has two inner side surfaces facing each other;
each inner side surface of the slot has two rod recesses defined in the inner side surface and respectively aligning with the rod recesses in the other inner side surface of the slot;
each holding rod is cylindrical and has two ends respectively held in the aligned rod recesses in the two inner side surfaces of the slot.

20. The bicycle saddle as claimed in claim 1, wherein
the slot of the sliding base has two inner side surfaces facing each other;
each inner side surface of the slot has two rod recesses defined in the inner side surface and respectively aligning with the rod recesses in the other inner side surface of the slot;
each holding rod is cylindrical and has two ends respectively held in the aligned rod recesses in the two inner side surfaces of the slot.

* * * * *